United States Patent Office
3,488,329
Patented Jan. 6, 1970

3,488,329
N-HYDROXY NITROGENOUS COPOLYMERS
John H. Johnson, Kirkwood, Mo., assignor to Monsanto Company, St. Louis, Mo., a corporation of Delaware
No Drawing. Filed Apr. 1, 1968, Ser. No. 717,942
Int. Cl. C07f 29/36, 31/04
U.S. Cl. 260—78.5
10 Claims

ABSTRACT OF THE DISCLOSURE

N-hydroxy-substituted hydrocarbon olefin-maleamic acid or -maleimide copolymers as new products and the method of preparing the same by reaction of a hydrocarbon olefin-maleic anhydride copolymer with hydroxylamine or a salt thereof.

BACKGROUND OF THE INVENTION

Field of the invention

New, nitrogenous derivative of hydrocarbon olefin-maleic anhydride copolymers.

Copolymers of maleic anhydride and hydrocarbon mono-olefins, e.g., ethylene or styrene, are well known. In the prior art they have been readily converted to water-soluble mono-amides, or to ammonium salts, or to half-amide, half-salts by reaction with ammonia or ammonium hydroxide. As disclosed in the Fields and Johnson Patent No. 2,921,928, the half-amide, half-salts may be converted to the polyimides by heating them at ordinary atmospheric pressure, and to the diamides by heating at super-atmospheric pressure. In the presently provided nitrogenous copolymers, there is present a hydroxy radial attached to the nitrogen of either an amide or imide structure. The hydroxy group contributes to the usefulness of the nitrogenous copolymers in that it participates to give a variety of derivatives, either through esterification or by chelation. The N-hydroxy-substituted maleamic acid copolymers are characterized by significant polyelectrolyte effect and the imide structure of the N-hydroxy-substituted polyimides make them particularly useful as the resins to which α-amino acids or low-molecular weight peptides may be attached in polypeptide synthesis.

SUMMARY OF THE INVENTION

This invention provides a new and valuable class of resinous polymers having the repeating unit

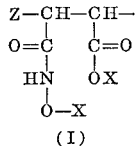

(I)

or

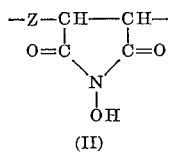

(II)

wherein Z is a bivalent, preferably alkylene, radical having from 2 to 18, preferably 2 to 12 carbon atoms, being free of aliphatic unsaturation, but may contain as a substituent an aryl or alkylaryl radical, and X is hydrogen or a salt-forming cation. Salt including the alkali metal salts, e.g. sodium and potassium, amines, such as pyridine or triethylamine and the like. The invention also provides a method of preparing the new copolymers which comprises reacting a hydrocarbon mono-olefin-maleic anhydride copolymers with hydroxylamine or a salt thereof. The reaction probably proceeds with formation of the maleamic acid (I). This is converted, by dehydration, into (III). When a hydroxylamine salt is used as the starting material instead of the free hydroxylamine, it is advantageous to operate in the presence of a scavenger for the by-product. For example, with hydroxylamine hydrochloride the hydrogen chloride which is evolved should be removed from the reaction zone as it is formed. For this purpose, reaction between the maleic anhydride copolymer and the hydroxylamine hydrochloride is conducted in the presence of a basic agent. This serves to neutralize the evolved hydrogen chloride and also to form a salt of the maleamic acid (I). When the base is a weak one, i.e., when it has a hydrogen ion concentration of less than about $1 \times 10^{-4}$, the maleamic acid salt is readily converted to the hydroxy imide (II) by vacuum drying. When stronger bases are used, the maleamic acid salts are much more stable; vacuum drying of such salts results in little, if any cyclization.

Accordingly, the N-hydroxy-substituted polyimides are conveniently obtained by contacting the the maleic anhydride copolymer with hydroxylamine hydrohalide in the presence of a base having an ionization constant of less than about $1 \times 10^{-4}$, recovering the polymeric salt thus obtained, and vacuum drying it to give the N-hydroxy-substituted polyimide. The N-hydroxy-substituted olefin-maleamic acids are conveniently prepared by contacting the maleic anhydride copolymer with hydroxylamine hydrohalide in the presence of a base having an ionization constant of substantially more than $1 \times 10^{-4}$ and recovering the polymeric salt thus obtained. Vacuum drying of the said salt does not cause it to change. The salt is readily converted to the free acid by customary acidulation; e.g., by treatment with dilute mineral acid. The N-hydroxy-substituted olefin-maleamic copolymers are also readily obtainable by working with the weak base, provided that salts of the maleamic acids with the weak base are converted to salts of the strong base before the drying step.

DESCRIPTION OF THE PREFERRED EMBODIMENTS

The presently provided N-hydroxy-substituted nitrogenous copolymers are preferably prepared by contacting a hydrocarbon olefin-maleic anhydride copolymer with hydroxylamine hydrochloride in the presence of a basic agent and in the presence or absence of an inert, liquid diluent or solvent.

The starting copolymer is preferably the copolymer of ethylene or styrene with maleic anhydride; however, it may be the copolymer of maleic anhydride and an aliphatic hydrocarbon olefin other than ethylene; e.g., propylene, 1-hexene, 1-octene, dodecene, 1-decene, 2-butene, 2-methyl-2-butene, 1-butene, 2,3-dimethyl-1-butene, hexadecene, 2-ethyl-1-butene, etc., or of an aryl- or aralkyl-substituted olefin such as, o- or p-methylstyrene, -methylstyrene, p-ethylstyrene, vinyl toluene α,p-dimethylstyrene, etc. The copolymer will generally contain substantially equimolar quantities of the olefin moiety and the maleic anhydride moiety; and it will have a degree of polymerization which will vary from, say, 100 to 10,000. As is known in the art, the molecular weight of the hydrocarbon olefin-maleic anhydride copolymers may be regulated by proper choice of catalyst (usually peroxidic) and of one or more of the other variables such as the nature of the olefin reactant, temperature, and catalyst concentration and the incorporation of any of several known chain-transfer agents (e.g., diisopropylbenzene, propionic acid, alkylaldehydes, etc.). For the present purpose, copolymers of a wide range of solubility characteristics may be used, the nature of the starting polymer being governed by the properties desired in the final product. When markedly insoluble products are the objective, it is often advantageous to employ copolymers which contain some cross-linking. Such cross-linked copolymers are known to be obtainable by conducting the copolymerization of maleic anhydride and hydrocarbon olefin in the presence of a cross-linking agent; e.g., a compound containing two olefinic double bonds, such as divinylbenzene or vinylcrotonate, poly 1,2-butadiene, α-ω diolefins. The quantity of cross-linking agent will vary with the degree of insolubility desired; generally, it will be in the order of from, say, 0.1% to 10% by weight of the total monomer mixture.

The hydroxylamine may be used in the form or its salt, e.g., as the hydroxylamine hydrohalide or hydrogen sulfate (i.e. it may be formed in situ) or it may be liberated from its salts prior to contacting the polymers. Generally, it is preferred to employ the commercially available hydroxylamine hydrochloride. Thereby, hydrogen chloride is formed as by-product. To obtain good yields of the N-hydroxy-substituted polymeric maleamic acid or imide, the hydrogen chloride should be removed from the reaction zone as it is formed. Although use of vigorous stirring and dephlegmation is conducive to such removal, generally, it is preferred to operate in the presence of a compound which acts as hydrogen chloride scavenger by uniting with it as it is evolved. Although any organic or inorganic basic material will serve this purpose, to form the polyimide, it is preferred to employ a weakly basic material. Usually, it will be an organic, tertiary ammonium base having a hydrogen ion concentration of less than, say, about $10^{-4}$. The weak bases permit ring closure to the cyclic imide. For obtaining the hydroxamic acid compounds, there may be initially used either the weak or the strong base; however, to avoid cyclization during drying of the product, the initially obtained salt of a weak base should be converted to the salt of a strong base before vacuum drying. As weak bases there may be employed any organic nitrogenous base having an ionization constant of about less than $1 \times 10^{-4}$; e.g., pyridine, quinoline or morpholine. Examples of the presently useful strong bases include the alkali metal hydroxides; i.e., sodium, potassium, lithium or rubidium hydroxide and the trialkylamines such as triethylamine or tributylamine.

When a hydroxylamine hydrohalide is employed as the reactant, there should be employed at least two and, preferably, three molar equivalents of the base per mole of the hydrohalide: one mole of the base serving to scavenge the hydrohalide, with formation of the hydrohalide of the base (e.g., pyridine hydrochloride when the base is pyridine and the hydrohalide is a hydrochloride) and the other mole or moles serving to provide for neutralizing a carboxy group of the polymer unit and, possibly, the N-hydroxy group of the N-hydroxyamide radical of the polymer unit. Thus, by employing slightly over three moles of pyridine per mole of hydroxylamine hydrochloride, formation of the hydroxyimide proceeds substantially according to the scheme:

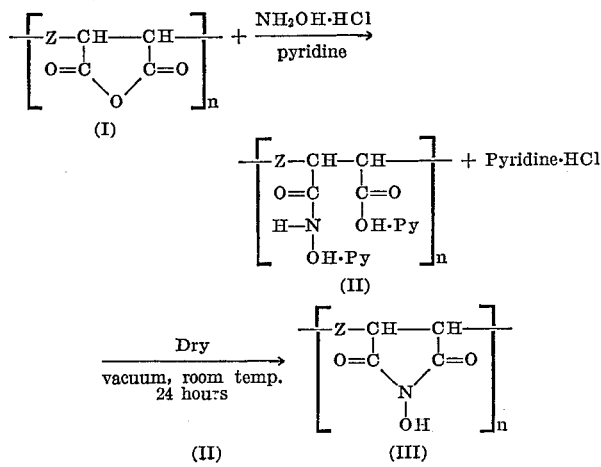

wherein Z is the therein defined alkylene or aryl-substituted alkylene radical, n denotes the degree of polymerization, and Py denotes pyridine.

One mole of the anhydride copolymer (I) is used with one mole of the hydroxylamine hydrochloride, and reaction is conducted at room temperature. When the polymeric hydroxamide (II) is vacuum-dried, it is cyclized to the hydroxyimide (III). However, if the pyridine of the (II) is replaced by alkali metal or by a strong organic base such as triethylamine, vacuum drying fails to result in cyclization; instead, there is isolated the polymeric hydroxamic acid salt wherein, depending upon the quantity of strong base which was used, one or both of the Py units of (II) have been replaced by the strong base. Subsequent hydrolysis, e.g., by treatment with water in the presence of an acid such as p-toluenesulfonic acid gives the free hydroxamic acid:

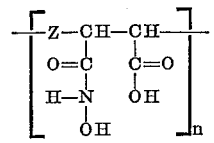

For obtaining the polyimide (III), the polyhydroxamic acid salt (II) is added to a non-solvent, e.g., absolute ethanol, and the precipitated solid is filtered off, washed, and vacuum dried. The drying step removes substantially all of the volatile base (e.g., pyridine) which may be present as the salt-forming portion of the copolymer. If absolute freedom from bases such as pyridine is required, washing with alcoholic hydrogen chloride effectively scavenges residual amount.

The presently provided polymeric N-hydroxyimides and hydroxamic acids are quite strongly acidic. The pK of the hydroxyimide —NOH group is about 7.2, or about the same as that of dinitrophenol. Both the hydroxyimides and the hydroxamic polymers are generally soluble in such polar solvents as water, dilute sodium hydroxide or ammonium hydroxide or other bases, dimethyl sulfoxide, N,N-dimethylformamide and N,N-dimethylacetamide. They are generally insoluble in hexane, ethyl ether, alcohol, dilute hydrochloric acid and dilute acetic acid.

As will be hereinafter shown, the present products are of particular utility as polymeric carriers in peptide synthesis. In certain instances, their usefulness for this purpose can be increased by employing swellable, but technically insoluble cross-linked modifications as the starting copolymers. Such copolymers can be obtained in several ways. For example, the maleic anhydride copolymer can be cross-linked, before being reacted with the hydroxylamine or the salts thereof, in a manner such as described in Patents Nos. 3,060,155; 3,073,806; 3,083,189; 3,203,033 or 3,165,486. The cross-linking may also be obtained by reaction with a polyfunctional primary amine in limited quantity designed to produce controlled amounts of intermolecular cross-links based on the amide linkage formed upon opening of the stoichiometric amounts of the anhydride groups. Using cross-linked products, one has added freedom in selecting the solvents to be employed in the peptide synthesis for which the present N-hydroxy-substituted copolymers are particularly designed.

As disclosed in our copending application Serial No. 717,987 (attorney's docket No. E-6), filed Apr. 1, 1968, the present N-hydroxy polymeric imides are employed as follows in peptide synthesis: the hydroxy groups are esterified with an N-blocked α-amino acid, preferably in a liquid medium which is a solvent for or swells the polymeric hydroximide and is a solvent for the blocked amino acid, thus:

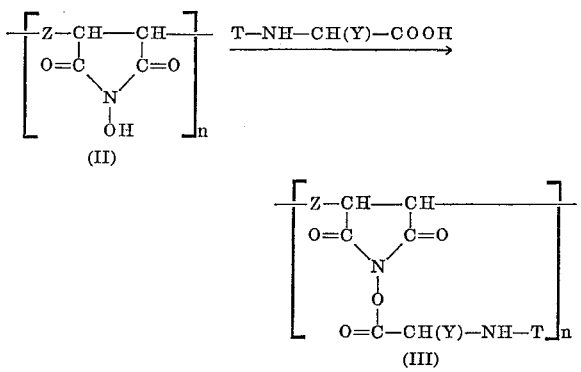

wherein Y is the remainder of the particular amino acid being employed in this reaction. The above esterification is advantageously conducted in the presence of a carboxyl-activating compound such as one of the several carbodiimides, e.g., dicylohexylcarbodiimide. The N-blocking group can be selected from those which are commonly employed in peptide synthesis, including the o-nitrophenylsulfenyl (NPS), the t-butoxycarbonyl (BOC), the carbobenzyloxy (CBZ) and the t-amyloxycarbonyl (AOC) groups. Such groups are readily and selectively removed when so desired by reactions with various dilute acids, hydrogenation, reaction with nucleophilic agents, etc. The esterified product (III) is very reactive. Upon contacting it with an α-amino carboxylic acid or with a peptide having a free α-amino group (such peptide may be in the form of the free C-terminal carboxylic acid or as its ester or amide), reaction occurs with cleavage of the labile ester linkage to form the new peptide bond and regenerate the N-hydroxyimide polymer. The new peptide can be a dipepetide if both the attached and attacking moieties are simple amino acids. If the initial attachment to the polymer is an existing peptide, the new peptide represents an extension of the C-terminal end of such attached peptide. If the attacking moiety is an existing peptide, the new peptide represents an extension of the N-terminal end of the attacking peptide.

Reaction of the esterified polymeric hydroxyimide (V) proceeds substantially as follows with an amino acid compound such as the methyl ester of glycine:

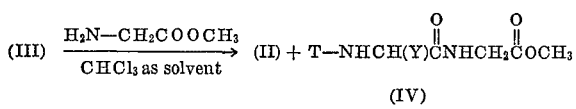

removal from (IV) of the N-blocking group (T) makes possible successive additions of amino acids or peptides. For example, after removal of the N-blocking, the residual peptide can be reacted with (III) instead of the glycine. It will be obvious, of course, that any N-blocked amino acid or peptide may be used to react with the N-hydroxyimide to form a reactive ester of the type shown in (III) and that any α-amino acid or peptide or ester or amide thereof may be used instead of glycine to make a new peptide. The peptide products are readily removed from the reaction mixture by simply filtering off the cleaved carrier polymer (II).

Although the presently provided N-hydroxy-substituted nitrogenous copolymers are particularly valuable for the production of peptides through the intermediate esters thereof with a blocked α-amino acid or peptide, they are also of interest per se as highly solvent-resistant solid polymers, which may be molded to give shaped objects. In the comparatively few liquid in which the new copolymers are soluble, e.g., dimethylformamide or dimethylacetamide, the solutions may be employed as coatings or cast into films or spun into fibers by extrusion through a constricted channel into a non-solvent. Both the N-hydroxyimides and the hydroxamic acids possess strong chelating and hydrogen bonding properties, and both of these types of resins have shown valuable performance as chelating agents and builders in detergent formulations, for example, as replacements for phosphates in detergent formulations.

The invention is further illustrated by, but not limited to, the following examples wherein all parts are by weight and all temperatures are degrees centigrade unless otherwise stated.

Example 1

To 500 ml. of water containing 55 g. (0.70 mole) of pyridine, there were added 25 g. (0.20 mole) of ethylene-maleic anhydride copolymer having a molecular weight of from 20,000 to 30,000. Hydroxylamine hydrochloride (15 g., 0.216 mole) representing an 8% excess, was dissolved in 100 ml. of water and this solution was added with stirring to the aqueous suspension of the copolymer. The resulting mixture became highly viscous in about 5 minutes; with continual stirring it became thinner, and eventually (2–3 hrs.) it formed a clear solution. Stirring was continued at room temperature over night. The resultant solution was poured into 10 volumes of absolute ethanol to effect precipitation of product, and the precipitate was washed with ethanol and dried in a vacuum oven at room temperature to constant weight. The yield was 27.2 g. or 97.5% of theory. To remove traces of pyridine, the dried product was resuspended in alcohol, acidified with a slight excess of hydrochloric acid, and stirred for 30 minutes. It was then washed four times with ethanol and again dried to constant weight to give the substantially pure N-hydroxy-substituted ethylene-maleimide copolymer, which analyzed as follows:

Calculated for imide: percent carbon, 51.1; percent hydrogen, 5.00; percent nitrogen, 9.93. Found: percent carbon, 51.8; percent hydrogen, 5.28; percent nitrogen, 9.43.

The product was found to be soluble in aqueous bases, dimethylformamide and dimethyl sulfoxide, and to be insoluble in most other solvents. Infrared characterization indicated a pair of carbonyl absorption peaks for the cyclic imide at $5.60$ and $5.90\mu$ replacing the pair associated with the cyclic anhydride at $5.40\mu$ and $5.62\mu$. Strong hydrogen bonding absorptions were observed at 2.90, 3.15 and $3.2$–$4.0\mu$. There was a total absence of the cyclic anhydride peaks and the absorption peaks associated with the intermediate hydroxamic acid derivatives.

Example 2

Reaction between ethylene-maleic anhydride copolymer (5 g., 0.04 mole) and hydroxylamine hydrochloride (2.75 g., 0.04 mole), conducted substantially as described in Example 1 was interrupted after precipitation of the product in ethyl alcohol. Rather than drying this product as described in Example 1, the alcohol insoluble portion was dissolved in an excess of dilute sodium hydroxide (1 N NaOH). The sodium salt of the product was then isolated by precipitation from the aqueous alkaline solution into ten volumes of absolute ethanol, yielding a fibrous product, which was then dried in air followed by drying under vacuum. The polymeric hydroxyamic sodium salt thus obtained was characterized by its infrared absorption spectrum as follows: single bridge hydrogen bond absorption at $2.9\mu$; unionized carbonyl absorption at $5.78\mu$; strong ionized carboxyl at $6.16\mu$; secondary amide bond absorption at $6.45\mu$. There was a total absence of the pair of absorptions associated with the cyclic N-OH imide polymer or the pair associated with the cyclic polymeric anhydride.

Example 3

Into 15 ml. of dimethylformamide there was dissolved 0.5 g. (3.5 mmole) of the N-hydroxy-substituted copolymer obtained in Example 1. Another solution was prepared by mixing N-carbobenzyloxyglycine (1.0 g., 4.8 mmole) with 15 ml. of dimethylformamide. The two solutions were combined, and 2.0 g. (5.8 mmole) of Sheehan's Reagent (1-cyclohexyl-3-(2-morpholinoethyl) carbodiimide toluenesulfonate) was added to the resulting mixture. The whole was stirred at 0° C. for about 18 hours. A by-product urea separated from the originally clear solution as the reaction proceeded. At the end of the reaction period, the urea (about 0.81 g.) was removed by filtration and the clear filtrate was poured into 10 volumes of absolute ethanol to give a precipitate. It was filtered off and washed on the filter twice with ethanol, three times with water and finally again with ethanol and dried overnight (about 18 hrs.) at less than 5 mm. pressure at room temperature. There was thus obtained 0.90 g. (76.0% of the theoretical yield) of the N-carbobenzyloxyglycyl ester of N-hydroxy-substituted ethylene-maleimide copolymer.

Infrared characterization of said ester indicated a disappearance of the N-OH group as shown by loss of absorption bands at 2.9, 3.15, and 3.2–4.0$\mu$, the retention of the imide carbonyl absorptions with a downward shift of 0.1 unit for the 5.90$\mu$ peak, and the introduction of a new ester carbonyl absorption band at 5.5$\mu$. The ester was soluble in dimethylformamide, dimethylacetamide and pyridine. It was insoluble in most other common solvents, but was slowly dissolved by dilute bases, presumably concurrently with resultant hydrolysis.

Example 4

Operating substantially as in Example 3, but using alanine which had been prepared with the amine blocked with carbo-t-butyloxy radical (or more commonly, t-butyloxycarbonyl or BOC), there was obtained the carrier resin bearing alanine residues attached by the previously described active ester linkage. The preparation is described as follows:

t-Butyloxycarbonyl-1-alanine (0.45 g., 2.4 mmole) was reacted with Sheehan's reagent (1.00 g., 2.4 mmole) for 30 mintues at 0° C. to activate the carboxyl. N-hydroxy-substituted ethylene-maleimide copolymer (0.25 g., 1.77 mmole) was dissolved in 5 ml. of dimethylformamide and this solution added to the initial solution in a 50 ml. Erlenmeyer flask and reacted for 20 hrs. with stirring at 0–4° C. The product was precipitated in 10 volumes of water (BOC-alanine is soluble in water and the excess was removed by this procedure). The solid was isolated by filtration and washed with water. The yield of polymeric active ester was 0.40 g. or 71.5% of the theoretical amount.

When alanine in the above example was replaced by the BOC derivatives of other amino acids and the analogous procedure followed, with an optional reaction temperature of 0° or room temperature, the following yields of the BOC amino acid active esters of the N-OH imide polymer were obtained: glycine, 72.5%; phenylalanine, 73.6%; nitroarginine, 53.8%.

Example 5

The N-carbobenzyloxyglycyl ester of N-hydroxy-substituted ethylene-maleimide copolymer was prepared as described in Example 3 starting with 0.5 g. (3.55 mmole) of the polymer and 0.74 g. (3.55 mmole) of N-carbobenzyloxyglycine. After filtration of the byproduct urea the active ester was precipitated with an excess of chloroform and washed thoroughly with chloroform on a sintered glass filter. It was then suspended in 10 ml. of chloroform and 0.1 g. (0.8 mmole) of glycine methyl ester hydrochloride and 0.2 g. (2.0 mmole) of triethylamine dissolved in 10 ml. of chloroform were added to the suspension. The mixture was stirred overnight at room temperature, filtered and the precipitate washed thoroughly with chloroform and ethyl acetate. The combined filtrate and washings were evaporated and the residue dissolved in ethyl acetate and filtered to remove some additional amounts of triethylamine hydrochloride. Evaporation of the filtrate gave as residue 0.25 g. of crude N-carbobenzyloxyglycyl ester of N-hydroxy-substituted ethylene-maleimide copolymer. This is somewhat in excess of theory based on the glycine hydrochloride methyl ester charged. Theory is 0.22 g. or 0.8 mmole. It is probable that conversion is close to 100% and that traces of unremoved triethylamine hydrochloride account for the rest. The product was then redissolved in ethyl acetate solution and washed with distilled water to remove the triethylamine salt. It was then washed twice with 0.1 N hydrochloric acid, twice with water, twice with dilute sodium carbonate solution and finally three times with water. The ethyl acetate solution was then dried over magnesium sulfate and filtered and evaporated to give 0.15 g. (0.54 mmole) or 67% yield of theory of pure product. Much of the loss from the original product was associated with physical losses from the large number of extraction operations. Infrared absorption pattern was determined and compared with a commercially obtained sample of CBZ—Gly—Gly—OCH$_3$; no differences were noted. The product had the same melting point, and did not depress the melting point of the known sample. The regenerated N-hydroxy-substituted ethylene-maleimide copolymer was isolated as a byproduct and characterized by infrared analysis, indicating a substantial reformation of polymeric N-hydroxyimide content. Removal of the carbobenzyloxy and methyl ester blockings in conventional manner (i.e., by treatment with hydrogen bromide in acetic acid solution) yields the hydrobromide salt of the dipeptide ester, Gly—Gly—OCH$_3$. After treatment with triethylamine to remove the hydrogen bromide, it was added to a fresh portion of N-carbobenzyloxyglycine active ester of N-hydroxy-substituted ethylene-maleimide copolymer to yield the tripeptide, CBZ—Gly—Gly—Gly—OCH$_3$.

Example 6

Styrene-maleic anhydride copolymer with a molecular weight of 20,000 to 30,000 (5.0 g., 25 mmole) was dissolved in 35 ml. of dimethylformamide and pyridine (7.0 g., 89 mmole) was added to this solution. Hydroxylamine hydrochloride (2.0 g., 29 mmole) was dissolved in 150 ml. of water and added to the reaction mixture dropwise with stirring. The reaction was continued overnight. The product was isolated by precipitation from ethanol and was dried under high vacuum. The yield was 5.37 g., which represents a 100% conversion to the N-hydroxyimide of the styrene-maleic anhydride copolymer. The product was identified by its infrared absorption spectrum. It had the pair of carbonyl peaks which are characteristic of the cyclic imide (5.65 and 5.90$\mu$) and a total absence of the cyclic anhydride and intermediate amic acid peaks.

It is to be understood that although the invention has been described with specific reference to particular embodiments thereof, it is not to be so limited, since change and alterations therein may be made which are within the full intended scope of this invention as defined by the appended claims.

What I claim is:
1. An N-hydroxy-substituted resinous copolymer having the repeating unit

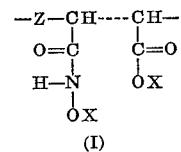

(I)

or

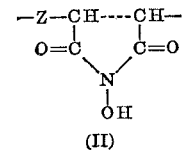

(II)

wherein Z is a bivalent radical having from 2 to 12 carbon atoms and X is hydrogen or a salt-forming cation.

2. The copolymer defined in claim 1, further limited in that Z is the ethylene radical.

3. The copolymer defined in claim 1, further liimited in that Z is the phenyl-substituted ethylene radical.

4. The copolymer defined in claim 1, further limited in that the repeating unit has the structure (I).

5. The copolymer defined in claim 1, further limited in that the repeating unit has the structure (II).

6. The copolymer defined in claim 1, further limited in that Z is the ethylene radical and that the repeating unit has the structure (I).

7. The copolymer defined in claim 1, further limited in that Z is the ethylene radical and that the repeating unit has the structure (II).

8. The copolymer defined in claim 1, further limited in that Z is the phenyl-substituted ethylene radical and that the repeating unit has the structure (II).

9. The copolymer defined in claim 1, further limited in that Z is the ethlylene radical, that the repeating unit has the structure (I) and that X is alkali metal.

10. The method which comprises contacting a resinous copolymer of the formula

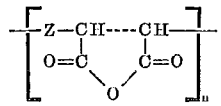

wherein Z is a bivalent radical having from 2 to 12 carbon atoms and $n$ denotes the degree of polymerization, with hydroxylamine hydrochloride in the presence of a basic agent to obtain a reaction product, precipitating said reaction product from a non-solvent, and vacuum-drying the precipitate to obtain a polymer of the formula

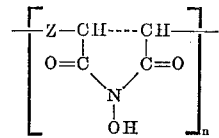

References Cited

UNITED STATES PATENTS 3,398,092   8/1968   Fields et al. _____ 260—78.5 XR

JOSEPH L. SCHOFER, Primary Examiner

JOHN KIGHT, Assistant Examiner

U.S. Cl. X.R.

260—78, 112.5